(12) United States Patent
Oggier et al.

(10) Patent No.: US 9,410,800 B1
(45) Date of Patent: Aug. 9, 2016

(54) 3D TOF CAMERA WITH MASKED ILLUMINATION

(75) Inventors: Thierry Oggier, Zurich (CH); Matthias Schweizer, Lenzburg (CH); Cornelia Prott, Zurich (CH)

(73) Assignee: Heptagon Micro Optics Pte. Ltd., Singapore (SG)

( * ) Notice: Subject to any disclaimer, the term of this patent is extended or adjusted under 35 U.S.C. 154(b) by 691 days.

(21) Appl. No.: 13/196,291

(22) Filed: Aug. 2, 2011

Related U.S. Application Data

(60) Provisional application No. 61/369,862, filed on Aug. 2, 2010.

(51) Int. Cl.
   *G01B 11/25* (2006.01)
   *G01B 9/02* (2006.01)

(52) U.S. Cl.
   CPC .............. *G01B 11/25* (2013.01); *G01B 9/0201* (2013.01)

(58) Field of Classification Search
   CPC .............................. G01B 9/0201; G01B 11/25
   USPC ......................................... 356/610, 611, 621
   See application file for complete search history.

(56) References Cited

U.S. PATENT DOCUMENTS

| | | | |
|---|---|---|---|
| 5,856,667 A | 1/1999 | Spirig et al. | |
| 6,794,214 B2 | 9/2004 | Berezin et al. | |
| 7,462,808 B2 | 12/2008 | Lustenberger et al. | |
| 7,929,751 B2 * | 4/2011 | Zhang et al. | 382/154 |
| 8,139,204 B2 * | 3/2012 | Braune et al. | 356/4.01 |
| 2002/0084430 A1 | 7/2002 | Bamji et al. | |
| 2004/0125373 A1 * | 7/2004 | Oldenbourg et al. | 356/364 |
| 2008/0239466 A1 | 10/2008 | Buettgen | |
| 2009/0020687 A1 * | 1/2009 | Lehmann et al. | 250/208.1 |
| 2009/0021617 A1 | 1/2009 | Oggier et al. | |
| 2010/0007896 A1 * | 1/2010 | Fishbaine | 356/603 |
| 2011/0025843 A1 | 2/2011 | Oggier et al. | |

FOREIGN PATENT DOCUMENTS

| | | |
|---|---|---|
| DE | 197 04 496 A1 | 3/1998 |
| EP | 1 513 202 A1 | 3/2005 |
| EP | 1 624 490 A1 | 2/2006 |
| GB | 2 389 960 A | 12/2003 |
| WO | 2006/012761 A1 | 2/2006 |
| WO | 2007/045108 A1 | 4/2007 |

OTHER PUBLICATIONS

Acharya, S. et al., "System Design of Time-of-Flight Range Camera for Car Park Assist and Backup Application," IEEE Computer Society Conference on Computer Vision and Pattern Recognition Workshops, 2008, 6 pages.

Ay, S.U., "A Hybrid CMOS APS Pixel for Wide-Dynamic Range Imaging Applications," IEEE International Symposium on Circuits and Systems, May 2008, pp. 1628-1631.

Buettgen, B. et al., "CCD/CMOS Lock-In Pixel for Range Imaging: Challenges, Limitations and State-of-the-Art," 1st Range Imaging Research Day, ETH Zurich, Switzerland, 2005, 12 pages.

(Continued)

*Primary Examiner* — Rebecca C Bryant
(74) *Attorney, Agent, or Firm* — Fish & Richardson P.C.

(57) ABSTRACT

A method and system for reducing multi-path effects (stray light and multiple reflections) in 3D time of flight cameras by partly masking the camera's illumination elements.

9 Claims, 13 Drawing Sheets

(56) References Cited

OTHER PUBLICATIONS

Buettgen, B. et al., "Demodulation Pixel Based on Static Drift Fields," IEEE Transactions on Electron Devices, vol. 53, No. 11, Nov. 2006, pp. 2741-2747.

Buettgen, B. et al., "Demonstration of a Novel Drift Field Pixel Structure for the Demodulation of Modulated Light Waves with Application in Three-Dimensional Image Capture," Proceedings of the SPIE, vol. 5302, 2004, pp. 9-20.

Buettgen, B., "Extending Time-of-Flight Optical 3D-Imaging to Extreme Operating Conditions," Ph.D. Thesis, University of Neuchatel, 2006.

Gokturk, S.B. et al., "A Time-of-Flight Depth Sensor—System Description, Issues and Solutions," Conference on Computer Vision and Pattern Recognition Workshop, vol. 3, 2004, p. 35.

Hagebeuker, B., "Mehrdimensionale Objekterfassung mittels PMD-Sensorik," ("Multi-Dimensional Object Detection by PMD Sensor"), Optik & Photonik, Mar. 2008, pp. 42-44.

Henke, W. et al., "Simulation and experimental study of gray-tone lithography for the fabrication of arbitrarily shaped surfaces," IEEE Workshop on Micro Electro Mechanical Systems, 1994, pp. 205-210.

Kawahito, S. et al., "A CMOS Time-of-Flight Range Image Sensor with Gates-on-Field-Oxide Structure," IEEE Sensors Journal, vol. 7, No. 12, Dec. 2007, pp. 1578-1586.

Lange, R., "3D Time-of-Flight Distance Measurement with Custom Solid-State Image Sensors in CMOS/CCD-Technology," Ph.D. Thesis, University of Siegen, Zurich, Jun. 2000.

Lange, R. et al., "Solid-State Time-of-Flight Range Camera," IEEE Journal of Quantum Electronics, vol. 37, No. 3, Mar. 2001, pp. 390-397.

Lange, R. et al., "Time-of-flight range imaging with a custom solid-state image sensor," Laser Metrology and Inspection, Proc. SPIE, vol. 3823, Munich, 1999, pp. 1-12.

Lustenberger, F. et al., "A Colour 3200fps High-Speed CMOS Imager for Endoscopy in Bio-Medical Applications," IEEE, 2004, pp. 415-418.

Moeller, T. et al., "Robust 3D Measurement with PMD Sensors," 1st Range Imaging Research Day, ETH Zurich, 2005, 14 pages.

Oggier, T. et al., "An all-solid-state optical range camera for 3D real-time imaging with sub-centimeter depth resolution (SwissRanger TM)," Optical Design and Engineering, Proceedings of the SPIE, vol. 5249, 2004, pp. 534-545.

Oggier, T. et al., "Novel Pixel Architecture with Inherent Background Suppression for 3D Time-of-Flight Imaging," Proc. of the SPIE, vol. 5665, Jan. 2005, pp. 1-8.

Oggier, T. et al., "SwissRanger SR3000 and First Experiences Based on Miniaturized 3D-TOF Cameras," 1st Range Imaging Research Day, ETH Zurich, 2005, 12 pages.

Schwarte, R. et al., "A new electrooptical mixing and correlating sensor: Facilities and Applications of the Photonic Mixer Device (PMD)," Proc. of the SPIE, vol. 3100, 1997, pp. 245-253.

Sinha, A. et al., "Effect of Back Surface Field on Photocurrent in a Semiconductor Junction," Solid-State Electronics, vol. 21, Pergamon Press Ltd., 1978, pp. 943-951.

Sinha, A. et al., "Effect of Heavy Doping on the Properties of High-Low Junction," IEEE Transactions on Electron Devices, vol. Ed-25, No. 12, Dec. 1978, pp. 1412-1414.

Spirig, T. et al., "The Lock-in CCD—Two-Dimensional Synchronous Detection of Light," IEEE Journal of Quantum Electronics, vol. 31, No. 9, Sep. 1995, pp. 1705-1708.

Tubert, C. et al., "High Speed Dual Port Pinned-photodiode for Time-of-Flight Imaging," International Image Sensor Workshop, 2009, Bergen, Norway, 3 pages.

Ushinaga, T. et al., "A QVGA-size CMOS time-of-flight range image sensor with background light charge draining structure," Three-Dimensional Image Capture and Applications VII, Proceedings of the SPIE, vol. 6056, 2006, pp. 605604-1 to 605604-8.

Van Nieuwenhove, D. et al., "Novel Standard CMOS Detector using Majority Current for guiding Photo-Generated Electrons towards Detecting Junctions," Proceedings Symposium IEEE/LEOS Benelux Chapter, 2005, pp. 229-232.

U.S. Appl. No. 61/092,548, filed Aug. 28, 2008, entitled "N-Tap Pixel for the Demodulation of Modulated Electromagnetic Wave Fields Based on Static Drift Fields," by Lehmann, M. et al.

* cited by examiner

3D TOF CAMERA WITH MASKED ILLUMINATION

RELATED APPLICATIONS

This application claims the benefit under 35 USC 119(e) of U.S. Provisional Application No. 61/369,862, filed on Aug. 2, 2010, which is incorporated herein by reference in its entirety.

BACKGROUND OF THE INVENTION

Three dimensional (3D) imaging time-of-flight (TOF) cameras are an active-type system. In general, systems are based on the phase-measurement technique of emitted intensity-modulated light, which is reflected by the scene. The reflected light is imaged onto a sensor. The photo-generated electrons are demodulated in the sensor, and based on the phase information, the distance for each pixel is deduced.

SUMMARY OF THE INVENTION

The present invention concerns the partial masking of the illumination elements of the illumination module in order to a) suppress the emitted light power outside the field of view (FOV) and/or b) to adjust the illumination power across FOV. The illumination power outside the FOV is in general suppressed as much as possible by such a mask. The illumination power inside the FOV is—in the general case—preferably not affected by the mask. However, based on a priori knowledge of the object to measure and its environment, it might be advantageous to mask the emitted power across FOV.

The invention presented herein gives the following advantages to TOF systems: reduction of stray light, reduction of multi-path, and decrease of required dynamic range The present invention can be combined with the invention described in US 2011/0025843 A1, which application is incorporated herein by this reference in its entirety.

In general, according to one aspect, the invention features a time of flight three dimensional imaging system. The system comprises an illumination module that generates modulated light that is intensity modulated, the illumination module comprising at least one illumination element, a mask for the illumination module defining a field of illumination of the illumination module, a sensor that detects the modulated light from a field of view at least partially within the field of illumination, and a controller that generates a three dimensional image from the detected modulated light.

In embodiments, the at least one illumination element of the illumination module comprises a light emitting diode or a laser diode. The mask preferably comprises illumination apertures associated with each of the illumination elements, the illumination apertures being transmissive portions of the mask, that are shaped based on the desired field of illumination. In some examples, the illumination apertures provide varying levels of attenuation laterally across the width of the illumination aperture. Generally, the field of illumination is selected to be substantially coextensive with, smaller than, or larger than the field of view.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
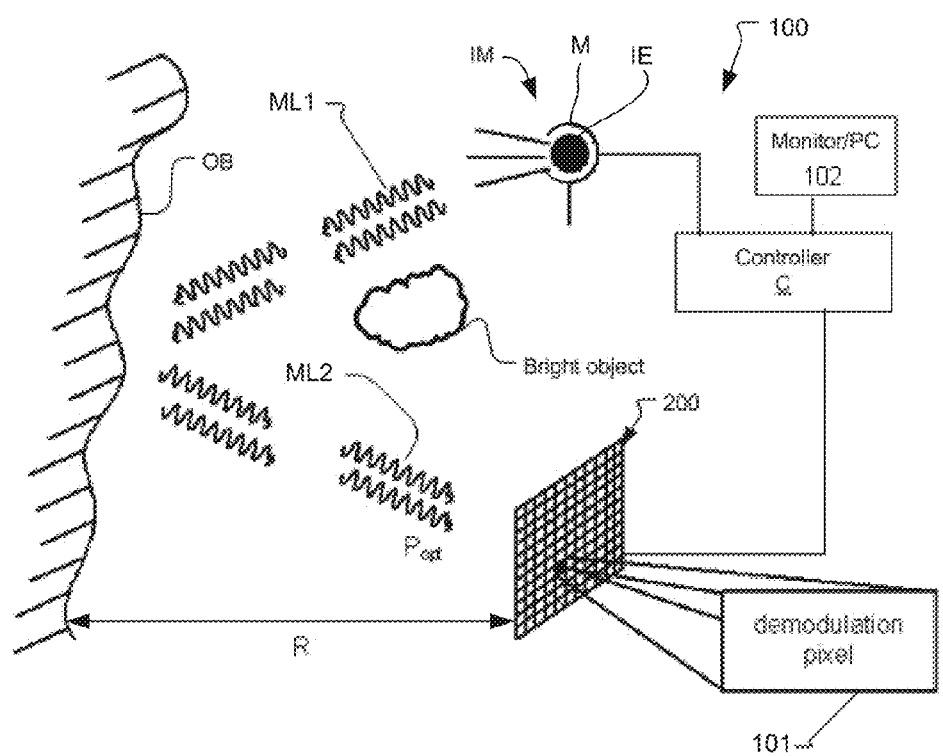
FIG. 1 is a schematic diagram showing the operation of a TOF camera.

FIG. 1 illustrates the basic principle of a 3D-measurement camera system 100 based on a sensor 200 comprising a two dimensional array of the demodulation pixels 101.

Intensity modulated illumination light ML1 at a predetermined modulation frequency from an illumination module or light source IM is sent to the object OB of a scene. The light is generated by illumination elements IE that are masked by a mask M, according to the invention.

A fraction of the total optical power sent out is reflected to the camera 100 and detected by the 3D imaging sensor 200 as reflected light ML2.

Each pixel 101 of the sensor 200 is capable of demodulating the impinging light signal ML2.

A controller C regulates the timing of the camera 100 so that the demodulation is synchronous with the modulation of light ML1 of the illumination module IM. The phase values of all pixels correspond to the particular distance information of the corresponding point in the scene. The two-dimension gray scale image with the distance information is converted into a three-dimensional image by the controller C. This is displayed to a user via display 102 or used as a machine vision input.

The distance R for each pixel is calculated by $$R=(c*\text{TOF})/2,$$

with c as light velocity and TOF corresponding to the time-of-flight. Continuously intensity-modulated light is sent out by the illumination module or light source IM, reflected by the object and detected by the sensor 200. With each pixel 101 of the sensor 200 being capable of demodulating the optical signal at the same time, the sensor is able to deliver 3D images in real-time, i.e., frame rates of up to 30 Hertz (Hz), or even more, are possible. Continuous sine modulation delivers the phase delay (P) between the emitted signal and the received signal, also corresponding directly to the distance R:

$$R=(P*c)/(4*pi*fMod),$$

where fmod is the modulation frequency of the optical signal ML1 generated by light source IM. Typical state-of-the-art modulation frequencies range from a few MHz up to a few hundreds of MHz or even GHz.

Current commercially available 3D TOF cameras use in general an illumination module IM that is constructed from an array of LEDs with micro-lenses that more or less have a similar field of illumination (FOI) to the field of view (FOV) covered by sensor 200 of the camera.

Laser-based 3D TOF cameras also require a specific micro-optical design to generate a FOI that matches to the FOV of the camera.

LEDs are commercially available as surface-mount devices. They can be ordered either without any micro-lens or with micro-lens. A micro-lens is required for narrower emission angles. With respect to 3D sensing, a narrow FOI has the advantage that most of the emitted light gets onto the FOV. However, the uniformity over the area gets lost. Usually, the light power in the center of the FOV is several times larger than the power at the corners. On the other side, a wide FOI shows an improved uniformity over the entire FOV, but a lot of power is wasted outside the FOV. This wasted power not only is lost but it also might disrupt the measurements.

Figure 2A:
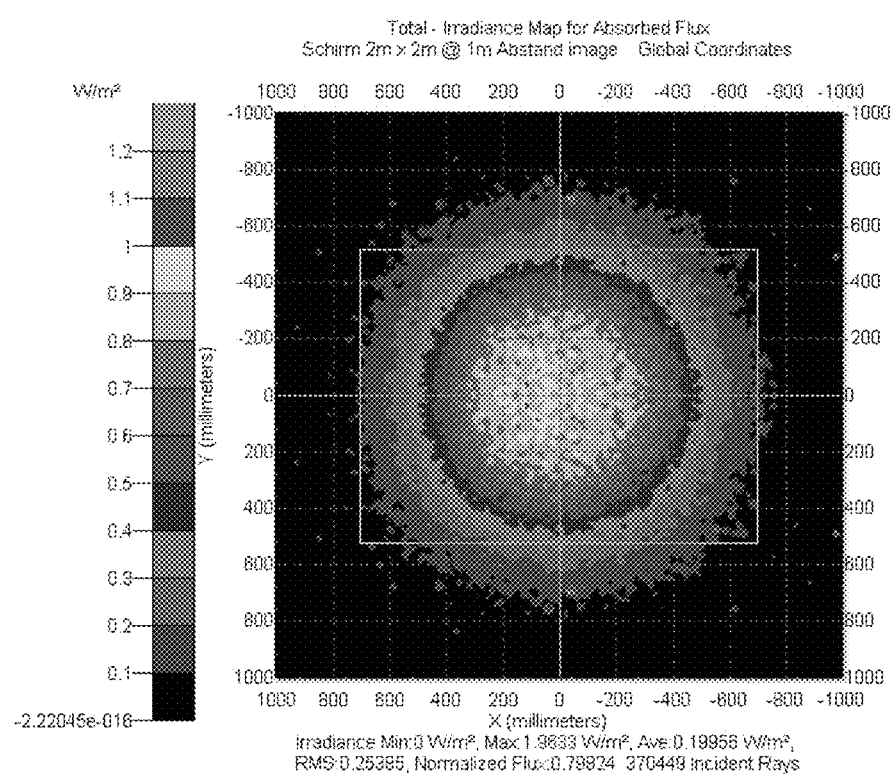
FIG. 2A is irradiance map and FIG. 2B is a plot of the horizontal and vertical distribution of irradiance showing the typical far field pattern of an LED with micro-lens.
Figure 2B:
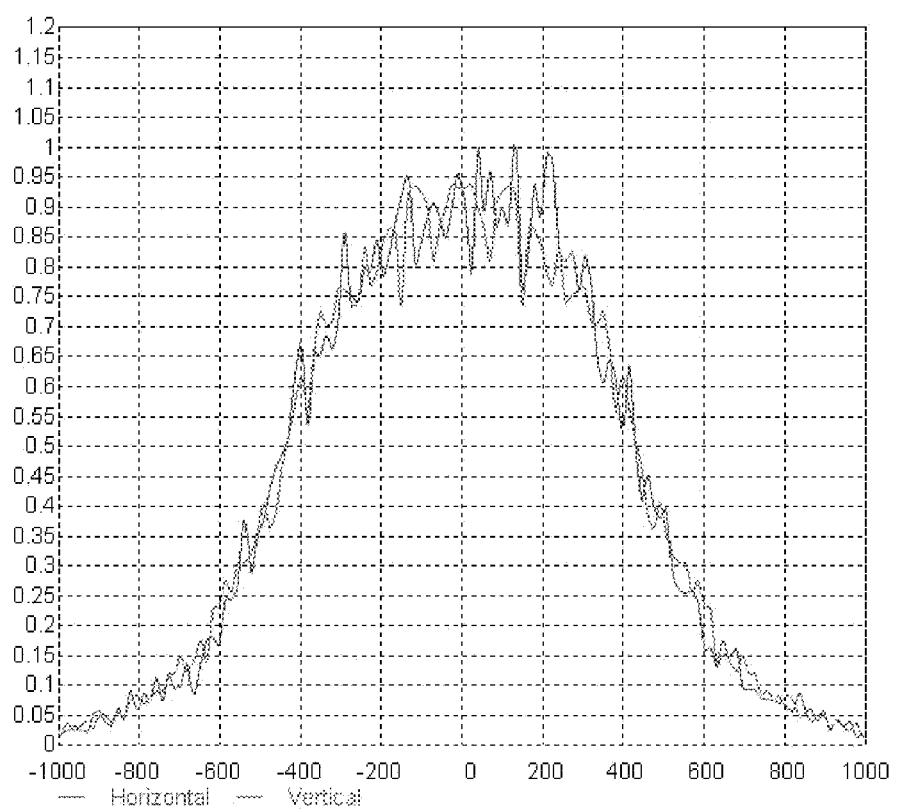

In general, the emission field has circular shape (see FIGS. 2A and 2B). On the other side, the imaged area on the image sensor, which determines together with the lens the FOV, corresponds to a square shape area, or a square-like area distorted by the lens (barrel, pincushion distortion).

A typical FOI pattern is shown in the simulation in FIG. 2A. It shows the intensity distribution on a 2×2 m target at a distance of 1m from the LED light source. The white square indicates the FOV of this specific camera. It can be seen that the corners of the FOV are not well illuminated while illumination power is wasted above and below the FOV.

Figure 3A:
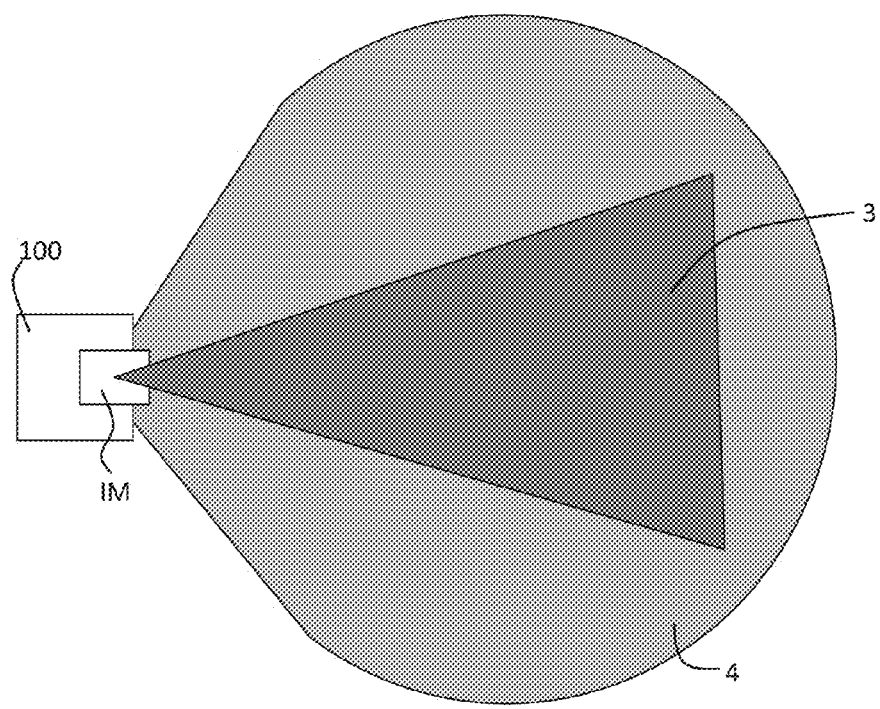
FIGS. 3A and 3B show a mismatch of FOV and FOI and a possible problem of multi-path, respectively.
Figure 3B:
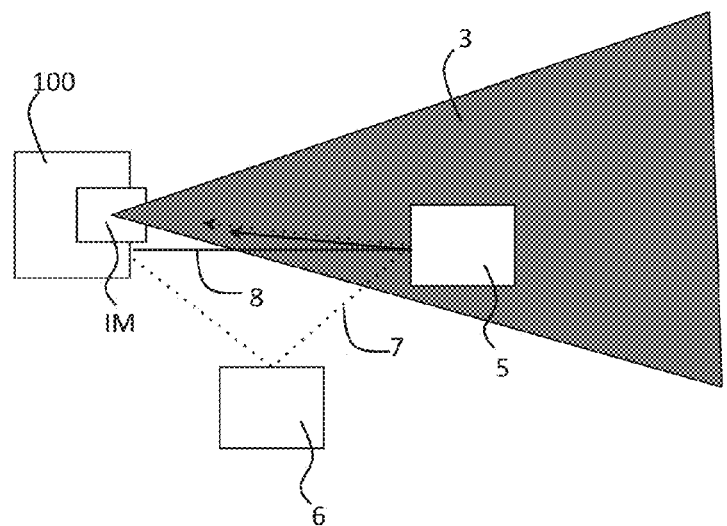

By having a wider FOI 4 than a FOV 3 (see FIG. 3A), it might happen that objects 6 outside the FOV reflect modulated light on objects in the FOV (see FIG. 3B). In such a case, the sensor 200 of the camera 100 gets a resulting image from the direct path 8 and the indirect path 7. Not only might this disturb the actual range measurement of the object 5 in the FOV 3, it also cannot be detected because the reflecting object 6 is outside the FOV 3 and cannot be seen by the camera 100.

Figure 4:
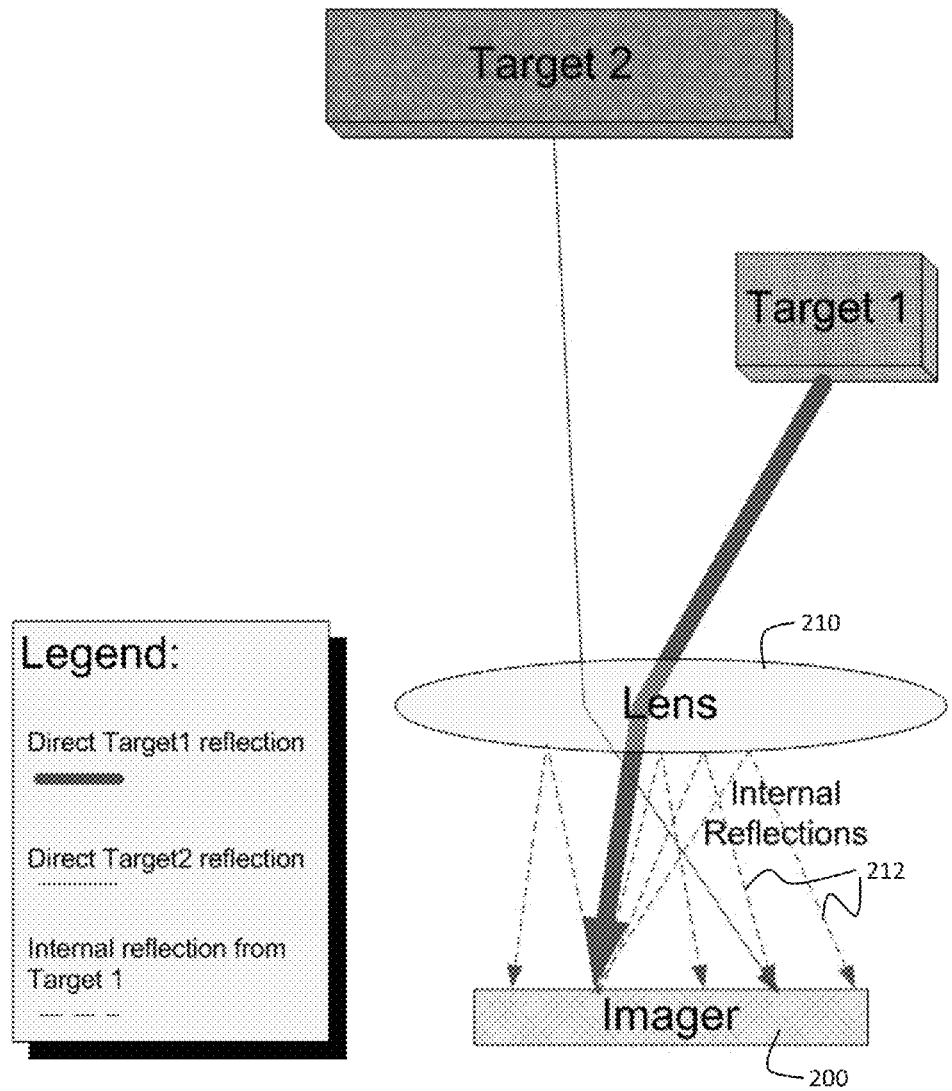
FIG. 4 shows the optical path having internal reflections (stray light) within the camera.

Stray light is a common challenge in 3D TOF cameras. Stray light originating from bright, close objects Target 1 might impact the measurements of low reflective target Target 2 at longer distances. Stray light is usually caused by the non-direct optical paths 212 inside the camera system 100. As shown in FIG. 4, the non-ideal path 212 is sketched as being reflections between the lens (objective) 210 and the imager sensor 200. However, stray light might also be generated by reflections inside the objective or by an optical filter added in the optical path.

In case of a 3D TOF system as illustrated in FIG. 3B, stray light might even be caused by objects that are not even in the field of view.

Figure 5:
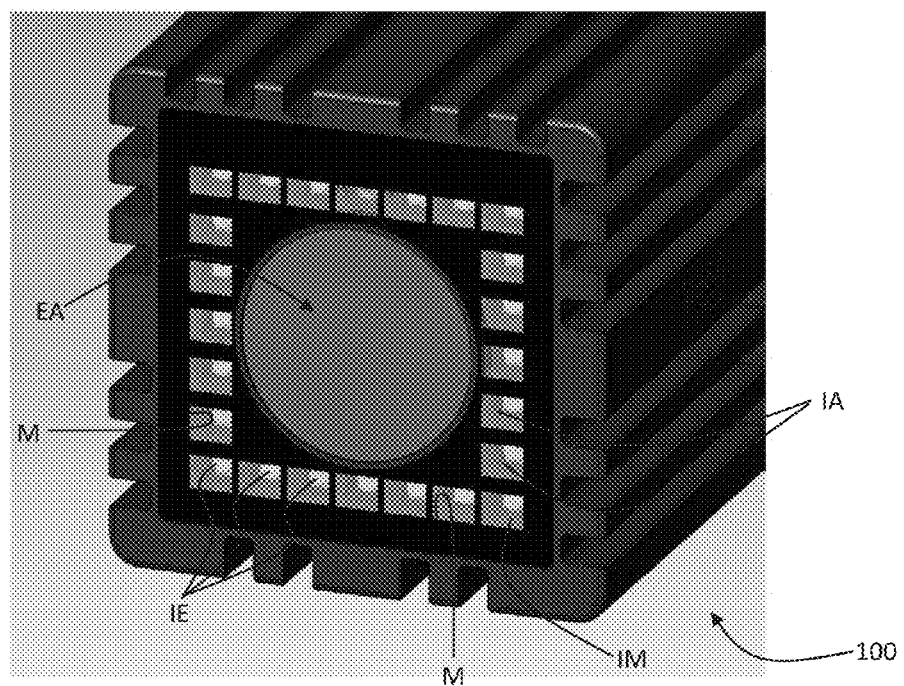
FIG. 5 is a perspective view showing a TOF camera.

FIG. 5 shows a TOF camera 100 constructed according to the principles of the present invention. The image sensor 200 along with object lens system and typically a bandpass filter are located behind the entrance aperture EA. The illumination module IM comprises 24 LED illumination elements IE in the illustrated example. The LED illumination elements implemented are standard off-the-shelf LEDs with a microlens on top to more or less shape the illumination beam.

In any case, still quite a lot of power would be emitted outside the FOV. This light does not contribute at all to the system performance; it only disturbs the measurements. Therefore, it is preferred to suppress as much as possible the illumination power outside the FOV, a mask M is added that provides an illumination aperture IA for each of the illumination elements IE. The illumination apertures IA are transmissive portions of the mask M through which light of the illumination elements is transmitted. The illumination apertures are shaped based on the desired field of illumination FOI. In some embodiments illumination apertures with different shapes are used with multiple illumination elements such that the net or sum illumination from the elements provides the desired pattern for the FOI.

The simulation promises a drastic reduction of the light power that is emitted outside the FOV. FIGS. 6A-6D illustrate the difference of the FOI with and without masking the illumination.

Figure 6A:
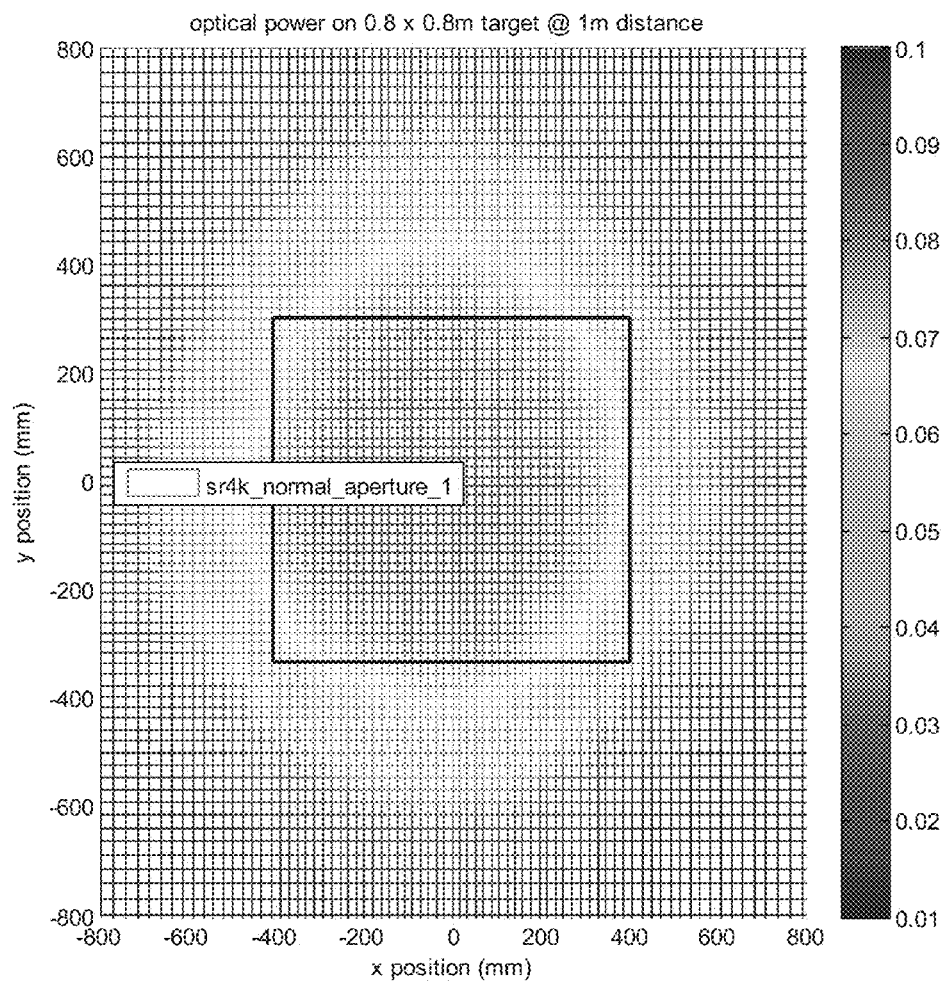
FIGS. 6A and 6C show the emitted light intensity distribution on a target at a distance of 80 cm. The rectangle indicates the actual FOV.
Figure 6B:
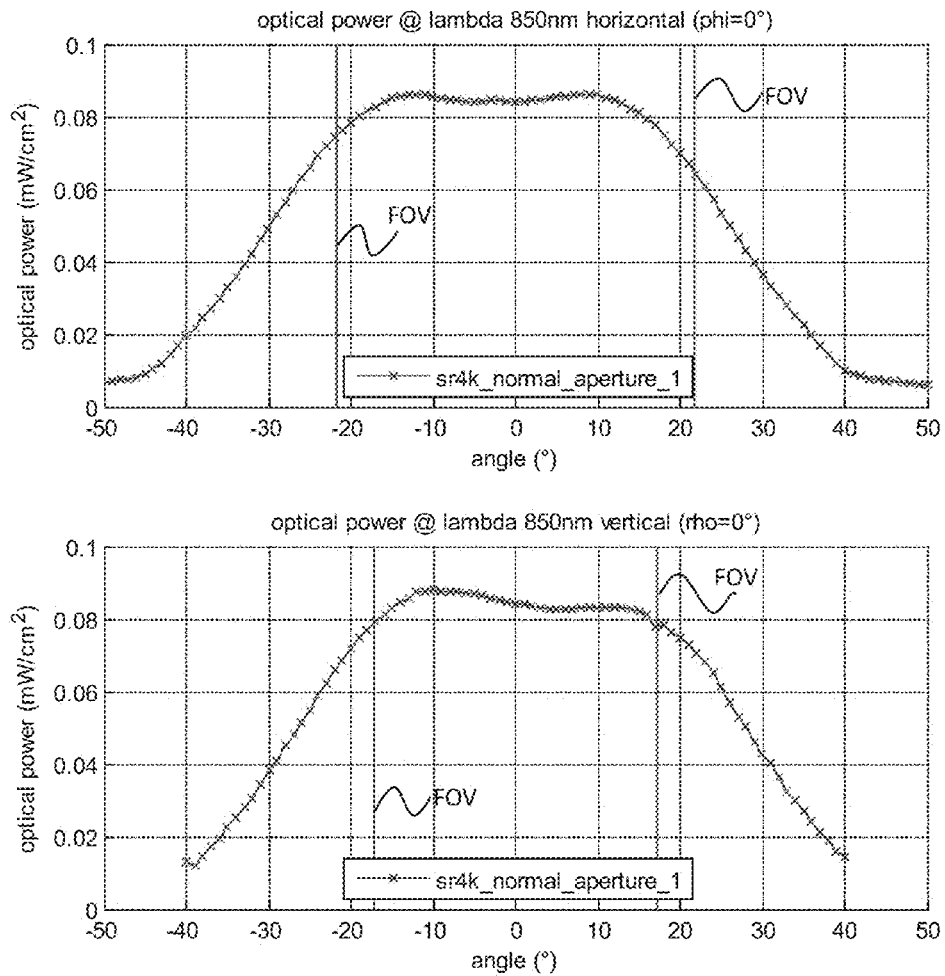
FIGS. 6B and 6D show the horizontal and vertical direct light distribution as a function of the opening angle
Figure 6C:
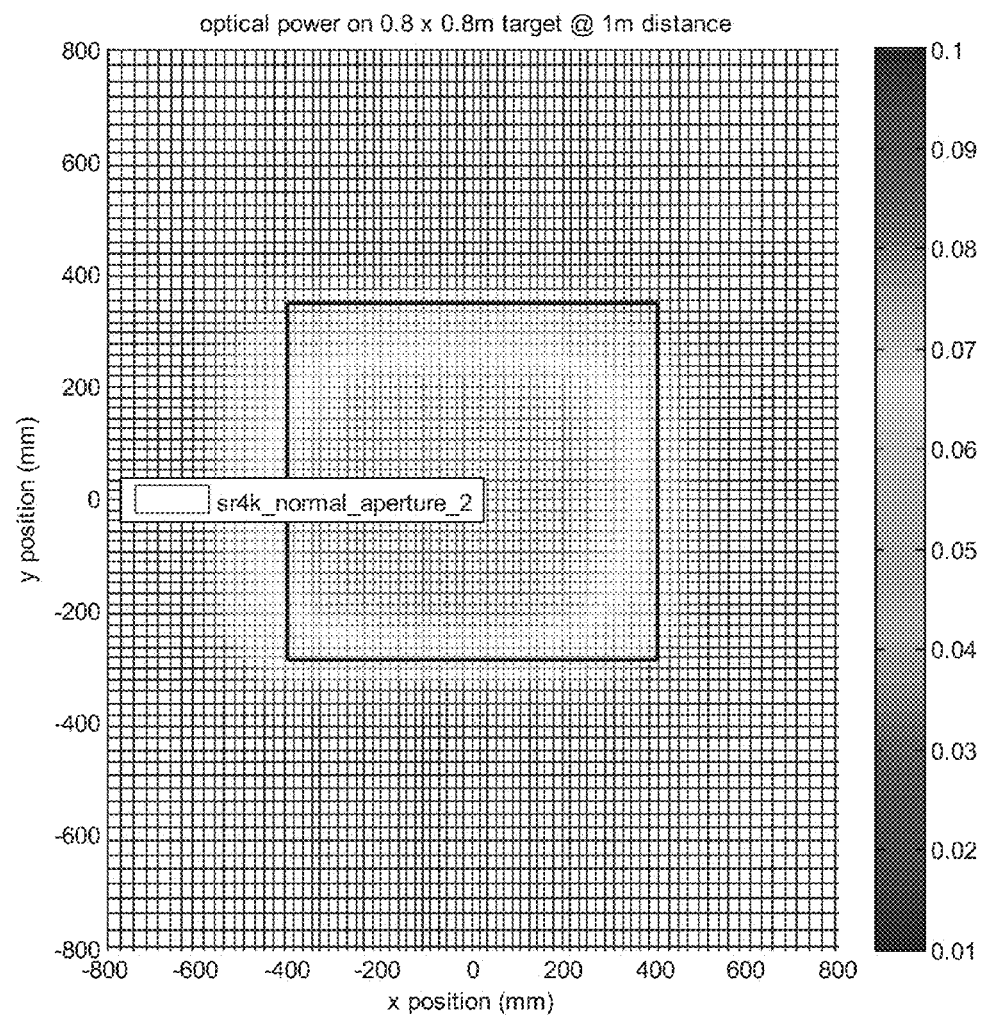

FIGS. 6A and 6C present the emitted light intensity distribution on a target at a distance of 80 cm. The rectangle indicates the actual FOV. One can see that there is much less light power emitted outside the FOV by the masked camera shown in FIG. 6C than by the unmasked shown in FIG. 6A.

Figure 6D:
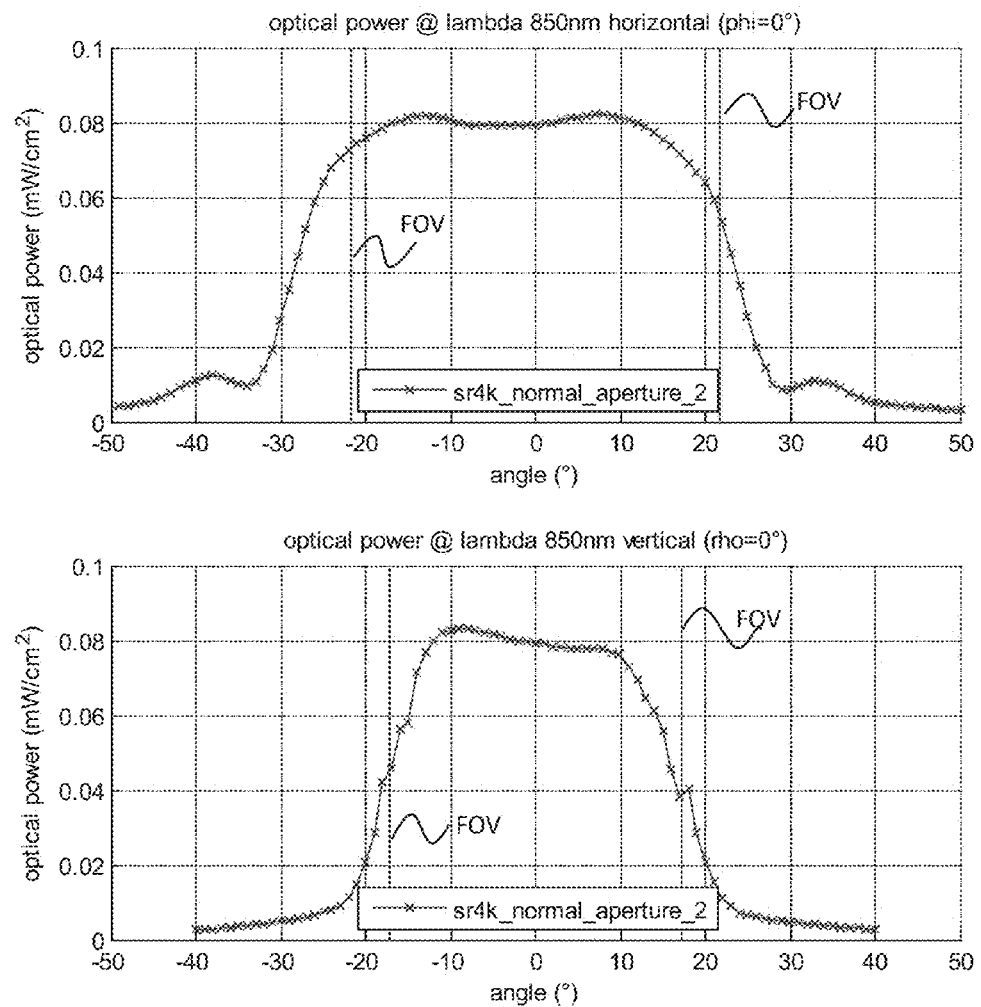

FIGS. 6B and 6D illustrate the horizontal and vertical section light distribution as a function of the opening angle for the unmasked camera FIG. 6B and the masked camera FIG. 6D. The FOV lines indicate the angular FOV in horizontal and vertical directions respectively. Again, the difference of light power emitted outside the FOV is drastic.

The suppression of emitted light outside the FOV as described above results in a tremendous reduction of stray light effects in many situations. At the same time, the power inside the FOV is almost kept at the same level as without any mask. Hence, the noise increase due to light power reduction is negligible.

Figure 7:
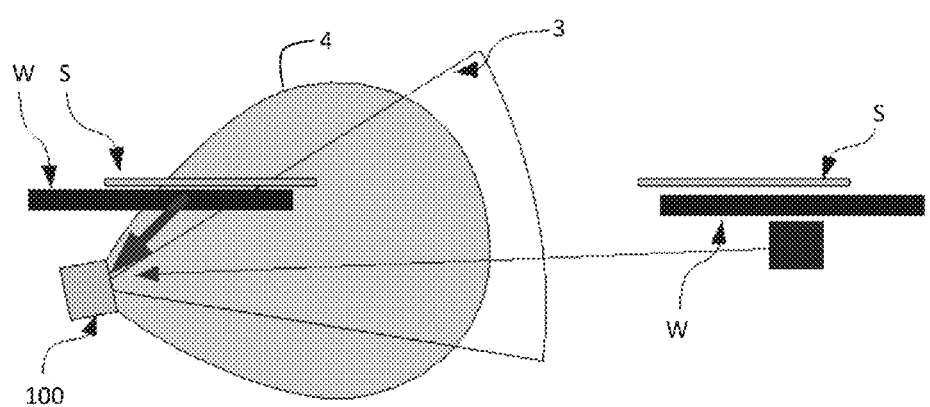
FIG. 7 is a top view of camera installation used to observe sliding doors without masking of the illumination elements.

The masking the LED illumination elements IE of the illumination module IM locally becomes extremely important in cases where close objects outside the FOV and low-reflective targets to measure are present. A typical example is the surveillance of sliding doors shown in FIG. 7. The camera 100 is placed close to the wall W and observes the sliding door S from the side. The wall W right next to the TOF camera 100 reflects in general much more light power back on the sensor 100 than objects at a larger distance. Stray light might occur even from the part of the wall that is outside the FOV 3 but within the FOI 4.

Figure 8:
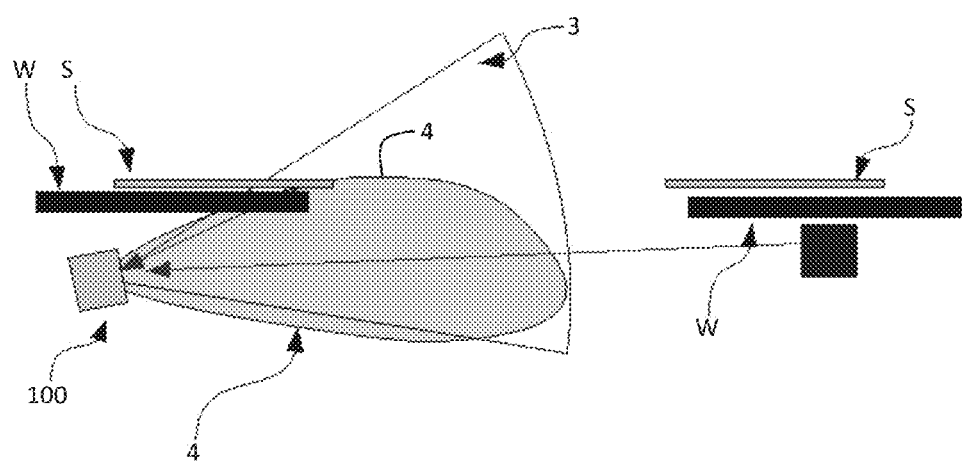
FIG. 8 is a top view of camera installation used to observe sliding doors with masking of the illumination elements.

By properly masking the illumination, the FOI 4 is shaped in a way as shown in FIG. 8. In this case, stray light generated by objects outside the FOV 3 are reduced. Further, the light power emitted on the wall W and sliding door S close to the camera 100 decreased.

Such TOF with partly masked illumination and non-uniformly illuminated FOV can be used in the surveillance of train platforms.

Figure 9:
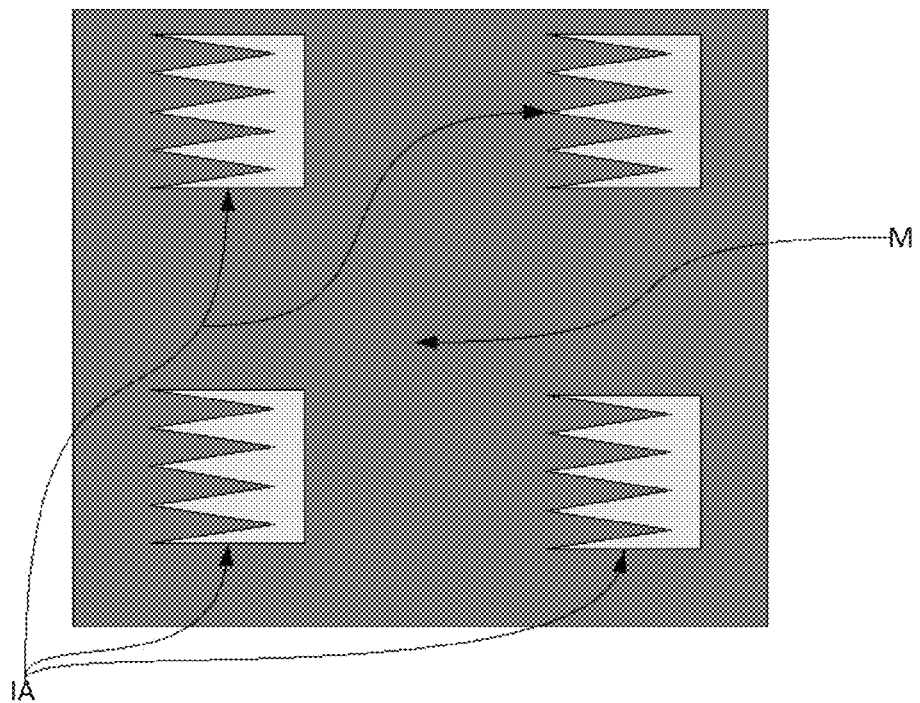
FIG. 9 shows an exemplary mast for tailoring the optical power emitted across the scene.

The mask M for such a light source might look as illustrated in FIG. 9. Here, the mask M has separate illumination apertures that provide varying levels of attenuation laterally across the width of the illumination aperture IA for each illumination element of the illumination module to provide a non-uniform field of illumination.

The illumination used together with the sample mask illustrated in FIG. 9 is based on four individual light sources, each one containing its own opening in the mask. The design sketched not only masks the illumination power outside the FOV to reduce stray light, but also changes the light distribution across the FOV in a less uniform, but maybe favorable way depending on the application.

In milking applications, the TOF camera is used to a) find the teats and the cups and b) to guide the robot arm in order to properly attach the cups to the teats. In this application, light power emitted in the upper part of the image might cause stray light problems, since the cow belly can get very close to the camera and reflect much more light back into the camera than the targets to be detected, namely the teats and the cups. In this application again, the light potentially emitted into the animal's belly is preferably masked to reduce stray light effects.

While this invention has been particularly shown and described with references to preferred embodiments thereof, it will be understood by those skilled in the art that various changes in form and details may be made therein without departing from the scope of the invention encompassed by the appended claims.

What is claimed is:

1. A time of flight three dimensional imaging system, comprising:
   an illumination module that generates modulated light to illuminate a scene, the modulated light being intensity modulated, the illumination module comprising illumination elements;
   a mask for the illumination module for defining a field of illumination of the illumination module, wherein the mask has a plurality of illumination apertures through which light of the illumination elements is transmitted, and wherein each illumination aperture is provided for a respective one of the illumination elements, the illumination apertures including at least two apertures differing in shape from one another;
   a sensor that detects the modulated light from the scene with demodulation pixels of an array, wherein a field of view of the sensor is at least partially within the field of illumination, and wherein the mask is arranged to suppress an amount of light power generated by the illumination module outside the field of view of the sensor; and
   a controller that generates a three dimensional image from the detected modulated light by determining a phase delay between the modulated light generated by the illumination module and the modulated light detected by the demodulation pixels of the array of the sensor to determine a time of flight of the modulated light from the illumination module to the scene and back to the sensor.

2. A system as claimed in claim 1, wherein the illumination elements of the illumination module comprise a light emitting diode.

3. A system as claimed in claim 1, wherein the illumination elements of the illumination module comprise a laser diode.

4. A system as claimed in claim 1, wherein the illumination apertures are shaped based on a particular field of illumination.

5. A system as claimed in claim 1, wherein the mask comprises illumination apertures that provide varying levels of attenuation laterally across the width of the illumination aperture.

6. A system as claimed in claim 1, wherein the field of illumination is selected to be substantially coextensive with the field of view.

7. A system as claimed in claim 1, wherein the field of illumination is selected to be smaller than the field of view.

8. A system as claimed in claim 1, wherein the field of illumination varies laterally across its width.

9. A system as claimed in claim 1, wherein the mask provides a non-uniform field of illumination.

* * * * *